3,658,995
METHODS FOR TREATING MENTAL FATIGUE
Enzo Marchetti, Rome, Italy, assignor to Instituto Farmacologico Serono S.p.A., Rome, Italy
No Drawing. Continuation-in-part of application Ser. No. 805,902, Mar. 10, 1969, which is a continuation of application Ser. No. 528,355, Feb. 18, 1966. This application June 25, 1969, Ser. No. 836,612
Claims priority, application Italy, Feb. 27, 1965, 4,102/65
Int. Cl. A61k 27/00
U.S. Cl. 424—319                     8 Claims

ABSTRACT OF THE DISCLOSURE

N-acetyl-α-aspartyl-L-glutamic acid $$CH_3CO-NH-CH-CO-NH-COOH$$
$$\phantom{CH_3CO-NH-}CH_2-COOH(CH_2)_2-COOH$$

and N-acetyl-β-L-aspartyl-L-glutamic acid $$CH_3CO-NH-CH-COOH$$
$$\phantom{CH_3CO-NH-}CH_2CO-NHCH-COOH$$
$$\phantom{CH_3CO-NH-CH_2CO-NHCH-}(CH_2)_2-COOH$$

and pharmaceutical compositions containing them which are used for the treatment of mental fatigue and related syndromes. A process for the preparation of N-acetyl-α-L-aspartyl-L-glutamic acid and N-acetyl-β-L-aspartyl-L-glutamic acid is also disclosed.

---

The present application is a continuation-in-part of application Ser. No. 805,902, filed Mar. 10, 1969, which is a continuation of application Ser. No. 528,355, filed Feb. 18, 1966, both now abandoned.

The present invention relates to the following substances: N-acetyl-α-L-aspartyl-L-glutamic acid $$CH_3CO-NH-CH-CO-NH-CH-COOH$$
$$\phantom{CH_3CO-NH-}CH_2-COOH\ (CH_2)_2-COOH \qquad (I)$$

and N-acetyl-β-L-aspartyl-L-glutamic acid:

$$CH_3CO-NH-CH-COOH$$
$$\phantom{CH_3CO-NH-}CH_2CO-NHCH-COOH$$
$$\phantom{CH_3CO-NH-CH_2CO-NHCH-}(CH_2)_2-COOH \qquad (II)$$

and to pharmaceutical compositions containing the acids; a process for preparing said acids, and to substances related to said acids.

The object of the present invention is the preparation of pharmaceutical compositions which may be used for the treatment of mental fatigue and related syndromes. A further object of the invention consists in a process for the preparation of the substances N-acetyl-α-L-aspartyl-L-glutamic acid and N-acetyl-β-L-aspartyl-L-glutamic acid.

A further object of the invention consists in preparation of the following substances which relate to N-acetyl-α-L-aspartyl-L-glutamic acid and to N-acetyl-β-L-aspartyl-L-glutamic acid, inasmuch as they constitute the stages of the synthetic preparation of the latter.

β-Methyl ester of N-acetyl-L-aspartic acid:

$$CH_3CONH-CH-COOH$$
$$\phantom{CH_3CONH-}CH_2-COOCH_3 \qquad (III)$$

β-Ethyl ester of N-acetyl-L-aspartic acid:

$$CH_3CONH-CH-COOH$$
$$\phantom{CH_3CONH-}CH_2-COOC_2H_5 \qquad (IV)$$

N-acetyl-methyl-α-L-aspartyl-diethyl-L-glutamate:

$$CH_3CONH-CH-CO-NH-CH-COOC_2H_5$$
$$\phantom{CH_3CONH-}CH_2-COOCH_3(CH_2)_2-COOC_2H_5 \qquad (Va)$$

N-acetyl-ethyl-α-L-aspartyl-diethyl-L-glutamate:

$$CH_3CONH-CH-CO-NH-CH-COOC_2H_5$$
$$\phantom{CH_3CONH-}CH_2-COOC_2H_5(CH_2)_2-COOC_2H_5 \qquad (Vb)$$

N-acetyl-β-L-aspartyl-diethyl-L-glutamate:

$$CH_3CO-NH-CH-COOH$$
$$\phantom{CH_3CO-NH-}CH_2-CO-NH-CH-COOC_2H_5$$
$$\phantom{CH_3CO-NH-CH_2-CO-NH-CH-}(CH_2)_2-COOC_2H_5 \qquad (VI)$$

Methyl N-acetyl-α-L-aspartate:

$$CH_3CONH-CH-COOCH_3$$
$$\phantom{CH_3CONH-}CH_2-COOH \qquad (VII)$$

N-acetyl-methyl-β-aspartyl-diethyl-L-glutamate:

$$CH_3CON-CH-COOCH_3$$
$$\phantom{CH_3CON-}CH_2-CO-NH-CH-COOC_2H_5$$
$$\phantom{CH_3CON-CH_2-CO-NH-CH-}(CH_2)_2-COOC_2H_5 \qquad (VIII)$$

The synthesis process of acids I and II consists essentially in the previous preparation of glutamates Va and Vb (for N-acetyl-α-L-glutamic acid I and of glutamates VI and VIII (for N-acetyl-β-L-glutamic acid (II) which glutamates are subjected thereafter to a controlled alkaline hydrolysis followed by acidification with mineral acids and vacuum concentration. Alternatively, triesters Va and Vb can be subjected to a treatment with resin Dowex–50W X4 (strong acid) (a trademark registered by the Dow Chemical Co., U.S.A.) and successive lyophilization, whereby N-acetyl-α-L-aspartyl-L-glutamic acid (I) is obtained which can be purified by crystallization. The controlled alkaline hydrolysis of N-acetyl-β-L-aspartyl-diethyl-L-glutamate (VI) leads to N-acetyl-β-L-aspartyl-L-glutamic acid (II), whose isolation from the reaction mixture is carried out by treating the alkaline solution (coming from the hydrolysis) with mineral acids and concentrating in a vacuum.

At the stage of preparation of N-acetyl-methyl-α-aspartyl-diethyl-L-glutamate (Va) and of N-acetyl-ethyl-α-L-aspartyl-diethyl-L-glutamate (Vb) there is carried out the condensation of a beta-ester of N-acetyl-L-aspartic acid, for example the β-methyl ester (III) of N-acetyl-L-aspartic acid or the β-ethyl ester (IV) of N-acetyl-L-aspartic acid, with a diester of L-glutamic acid. The β-methyl ester (III) of N-acetyl-L-aspartic acid is prepared from beta-methyl ester of L-aspartic acid by reacting with acetic anhydride.

The condensation of the β-methyl ester (III) of N-acetyl-L-aspartic acid or of β-ethyl ester (IV) of N-acetyl-L-aspartic acid with a diester of L-glutamic acid is carried out, according to the invention, through the preparation of mixed anhydrides, which are obtained by reacting an organic base salt (for example, triethylamine) of β-methyl ester (III) of N-acetyl-L-aspartic acid or β-ethyl ester (IV) of N-acetyl-L-aspartic acid with an alkyl chlorocarbonate (for example, ethyl, isopropyl, or isobutyl chlorocarbonate). The mixed anhydrides without being isolated are directly condensed in suitable conditions with a diester of L-glutamic acid to give, in the case of diethyl-L-glutamate, N-acetyl-methyl - α-L-aspartyl-diethyl-L-glutamate (Va) or, respectively, N-acetyl-ethyl-α-L-aspartyl-diethyl-L-glutamate (Vb).

Alternatively, another preferred method of synthesis of the esters N-acetyl-methyl-α-L-aspartyl-diethyl-L-glutamate (Va) and N-acetyl-ethyl-α-L-aspartyl-diethyl-L-glutamate (Vb) is given by the direct condensation of the β-methyl ester (III) of N-acetyl-L-aspartic acid or of the β-ethyl ester (IV) of N-acetyl-L-aspartic acid with a diester of L-glutamic acid by means of dicyclohexylcarbodiimide in a suitable solvent such as methylene chloride.

The stage of preparation of N-acetyl-β-L-aspartyl-diethyl-glutamate is carried out according to the invention by condensing the anhydride of N-acetyl-L-aspartic acid with a diester of L-glutamic acid such as the diethyl ester. This reaction leads to a mixture of N-acetyl-α-L-aspartyl-diethyl-L-glutamate and its beta-isomer (VI).

The separation of these two isomers is carried out by taking advantage of the higher acidity of the carboxyl group of N-acetyl-β-L-aspartyl-diethyl - L - glutamate (VII); practically by means of a fractional extraction with diluted solutions of alkaline carbonates, of a solution of the mixture of the two isomer in ethyl acetate. By acidifying the first fractions the separation of N-acetyl-β-L-aspartyl-diethyl-L-glutamate (VI) occurs.

Lastly, the stage of preparation of N-acetyl-methyl-β-L-aspartyl-diethyl-L-glutamate (VIII) comprises the formation of a mixed anhydride, which can be obtained by reacting the salt of methyl N-acetyl-α-L-aspartate (VII) (in turn obtained by acetylating methyl-α-aspartate) with an organic base such as triethylamine and an alkyl chlorocarbonate e.g. ethyl, isopropyl or isobutyl chlorocarbonate in a suitable solvent.

The mixed anhydride (without being isolated) is directly treated in the reaction mixture with diethyl-L-glutamate, to give N-acetyl-methyl-β-aspartyl-diethyl-L-glutamate (VIII).

The following examples illustrate the process of preparation of the compounds. Of course variations to the process as indicated in the examples can easily be made by experts in the art without departing from the scope of the invention. In the examples temperatures are given in ° C. In each example an individual process for obtaining the substance involved as well as the stage of the entire process for reaching N-acetyl-α-L-aspartyl-L-glutamic acid (I) or N-acetyl-β-L-aspartyl-L-glutamic acid (II), as above discussed, is given.

EXAMPLE 1

β-methyl ester of N-acetyl-L-aspartic acid (III)

147 grams of β-methyl-L-aspartate is treated with 200 ml. of acetic acid anhydride for a period of one hour at 80–90°.

The reaction mixture is cooled to 50° and the anhydride excess is distilled off at 1.5 mm. The residue is dissolved in 300 ml. absolute ethanol and the obtained solution is evaporated at 30° and 1.5 mm. of pressure.

The latter operation is repeated 3 times, and the raw product, dissolved in 70 ml. absolute ethanol, is crystallized by diluting with 200 ml. anhydrous ethyl ether and 200 ml. petroleum ether (B.P. 30–50°).

After standing some hours at 0° crystals of β-methyl ester of N-acetyl-L-aspartic acid (M.P. 144–5), $[\alpha]_D^{22°}=+9°$ (c.=10 in absolute ethanol) are obtained.

Analysis.—Calcd. for $C_7H_{11}O_5N$ (percent): C, 44.44; H, 5.86. Found (percent): C, 44.56; H, 6.08.

EXAMPLE 2

N-acetyl-ethyl-α-L-aspartyl diethyl-L-glutamate (Vb)

40.6 grams of N-acetyl-β-ethyl-L-aspartate (IV) are dissolved in 400 ml. toluene and 150 ml. anhydrous chloroform. To the solution thus obtained, 28.4 ml. triethylamine is added and the mixture is cooled to −5° C. Thereafter, 26 ml. isobutylchlorocarbonate is dropped slowly into the solution; and after 15 minutes, there is added, little by little a precooled (to −5°) solution of 90 grams diethyl-L-glutamate-para-toluene-sulphonate and 34 ml. of triethylamine in an anhydrous mixture of 70 ml. toluene and 200 ml. chloroform.

Once the addition is completed, the temperature is allowed to rise to 20° under stirring for 6 hours. Thereafter, the reaction mixture is washed with 100 ml. 2 N HCl, 100 ml. sodium bicarbonate in 10% aqueous solution, and lastly with 100 ml. water. The organic phase is dried with anhydrous sodium sulphate and the solvent is stripped at 60° and 15 mm. The oily residue is dissolved in 80 ml. absolute alcohol and the solution obtained is diluted with 300 ml. anhydrous ether. The mixture is filtered by a folded filter and there is added 400 ml. petroleum ether (B.P. 30–50°).

After standing for 12 hours at 0°, crystals of N-acetyl-ethyl-α-L-aspartyl-diethyl-L-glutamate are formed. Melting point 94–5° $[\alpha]_D^{17°}=+24°$. (c.=5 in absolute ethanol).

Analysis.—Calcd. for $C_{17}H_{28}O_8N_2$ (percent): C, 52.57; H, 7.27. Found (percent): C, 52.46; H, 7.22.

EXAMPLE 3

N-acetyl-methyl-α-L-aspartyl diethyl-L-glutamate (Va)

56.7 grams of N-acetyl-β-methyl - L - aspartate (III), dissolved in 500 ml. methylene chloride is treated with a solution of 112.5 grams diethyl-L-glutamate-para-toluensulphonate and 42 ml. triethylamine in 250 ml. methylene chloride. Thereafter, a solution of 62 grams dicyclohexylcarbodiimide in 300 ml. methylene chloride is added under stirring, and the mixture is stirred for 6 hours at 22°; thereafter, the reaction mixture is acidified with 3 ml. glacial acetic acid, is stirred for 30 minutes more at 22°, and then left to stand for 12 hours.

The mixture is vacuum filtered, and the filtrate is distilled at 15 mm.; the residue is solubilized with 1800 ml. ethyl acetate and the obtained solution, after being washed with 100 ml. distilled water, is dried over anhydrous sodium sulphate and evaporated at 15 mm.

The oily residue is dissolved in 50 ml. absolute boiling ethanol, is cooled and diluted with 250 ml. anhydrous ethyl ether. The solution is filtered through a folded filter, 300 ml. petroleum ether (B.P. 30–50°) is added to the filtrate and the solution is left to stand at 0° for 12 hours.

Thus, N-acetyl-methyl-α-L-aspartyl-diethyl - L - glutamate is obtained, melting point 122–4° and $[\alpha]_D^{25°}=-24°$ (c.=5 in water).

Analysis.—Calcd. for $C_{16}H_{26}O_8N_2$ (percent): C, 51.33; H, 7.00. Found (percent): C, 51.37; H, 7.08.

EXAMPLE 4

N-acetyl-α-L-aspartyl-L-glutamic acid (I)

73 grams N- acetyl-ethyl-α-L-aspartyl-diethyl-L-glutamate (Vb) are dissolved in 1130 ml. N NaOH. The solution is kept for 2 hours at 20°; then it is poured into a suitable chromatographic column prepared with 1400 grams resin Dowex 50W X4 (strong acid) [trademark Dow Chemical Co.] 100–200 mesh, in H+ ionic form, moisture 65–72%.

The column is eluted with 3000 ml. distilled water and the eluate (sharply acid) is lyophilized.

The lyophilized solid crystallizes after dissolution in 300 ml. anhydrous boiling acetone.

Crystals of N-acetyl-α-L-aspartyl-L-glutamic acid are obtained, melting point 171–5° with decomposition, and $[\alpha]_D^{25°}=-27°.5$ (c.=2 in water).

Analysis.—Calcd. for $C_{11}H_{16}O_8N_2$ (percent): C, 43.42; H, 5.30. Found (percent): C, 43.36; H, 5.46.

EXAMPLE 5

N-acetyl-β-L-aspartyl-diethyl-L-glutamate (VI)

157 grams N-acetyl-L-aspartic acid anhydride are suspended in 800 ml. ethyl acetate and poured slowly into a solution of 203 grams diethyl-L-glutamate in 1000 ml. ethyl acetate. Thus, a solution is obtained which, after standing at 20° for 12 hours, is washed successively with 200 ml. N HCl and 200 ml. water. The solution is then extracted with 6 60-ml.-portions of a 12% aqueous solution of monohydrate sodium carbonate.

The pool of alkaline solutions is acidified to a pH of 2.5 with 5 N HCl to obtain a precipitate of N-acetyl-β-L-aspartyl-diethyl-L-glutamate, which is purified by crystallization from water. The pure product has a melting point of 149–50° and $[\alpha]_D^{25°} = -46°$ (c.=5 in water).

*Analysis.*—Calcd. for $C_{15}H_{24}O_8N_2$ (percent): C, 49.99; H, 6.71. Found (percent): C, 49.78; H, 6.54.

Example 6

N-acetyl-β-L-aspartyl-L-glutamic acid (II)

40 grams N-acetyl-β-L-aspartyl-diethyl-L-glutamate are dissolved in 400 ml. N NaOH; the solution is kept for 90 minutes at 22°, then it is acidified to pH 2 with 5 N HCl. The solution is lyophilized to obtain a dry residue which is dissolved in 150 ml. absolute boiling ethanol. The cool solution is filtered through a folded filter, and the solvent is evaporated at 20° and 0.01 mm.

The dry residue is crystallized from acetone; thus, N-acetyl - β - L - aspartyl - L - glutamic acid is obtained, melting point 103–5° (with decomposition) and $[\alpha]_D^{24°} = -37° .5$ (c.=2 in water).

*Analysis.*—Calcd. for $C_{11}H_{16}O_8N_2$ (percent): C, 43.42; H, 5.30. Found (percent): C, 43.46; H, 5.44.

EXAMPLE 7

α-methyl ester of N-acetyl-L-aspartic acid (VII)

30 grams α-methyl-L-asparate are dissolved in 100 ml. distilled water; the temperature of the solution is raised to 90°, and 100 ml. acetic acid anhydride is added rapidly.

The solution is cooled to 20°, 100 ml. more acetic acid anhydride is added, and the mixture is stirred at 20° for 6 hours.

The solvent is evaporated at 30° and 0.01 mm., and the residue is crystallized from acetone-petroleum ether, The pure ester VII is obtained, melting point 121–2° and $[\alpha]_D^{23°} = -12$ (c.=5 in absolute ethanol).

*Analysis.*—Calcd. for $C_7H_{11}O_5N$ (percent): C, 44.44; H, 5.86. Found (percent): C, 44.37; H, 5.90.

EXAMPLE 8

N-acetyl-methyl-β-L-aspartyl-diethyl-L-glutamate (VIII)

A solution of 37.8 grams N-acetyl-α-methyl-L-aspartate (VII) in 400 ml. anhydrous toluene, 150 ml. anhydrous chloroform and 28.4 ml. triethylamine, is cooled to −5° and is added with 26 ml. isobutylchlorocarbonate. After 15 minutes, a solution (precooled to −5°) of 57.4 grams diethyl-L-glutamate hydrochloride in 70 ml. anhydrous toluene, 200 ml. anhydrous chloroform and 34 ml. triethylamine is dropped slowly. The temperature is then raised to 20°, and the mixture is stirred for 6 hours, at this temperature, then it is washed successively with 100 ml. 2 N HCl, 100 ml. sodium bicarbonate in 10% aqueous solution and with 100 ml. distilled water.

The organic phase is dried with sodium sulphate and the solvents are removed at 60° and 15 mm.

The residues obtained by crystallization from mixtures of absolute alcohol and petroleum ether, yields the triester VIII, melting point 103–5° and $[\alpha]_D^{22°} = -36° .2$ (c.=4 in 95% ethanol).

*Analysis.*—Calcd. for $C_{16}H_{26}O_8N_2$ (percent): C, 51.33; H, 7.00. Found (percent): C, 51.13; H, 6.86.

The substances N-acetyl-α-L-aspartyl-L-glutamic acid and N-acetyl-β-L-aspartyl-L-glutamic acid may be combined in compositions suitable for the treatment of man and animals to improve mental efficiency or for the treatment of mental fatigue and related syndromes, which compositions comprise the above acids either singly or in mixtures thereof as active ingredient and pharmaceutical excipients known for the production of formulations suitable for oral or parenteral administration. Suitable excipients are, for example, water, calcium carbonate, lactose, starches, talcum, magnesium stearate, gelatin, vegetable oils and other known medicinal excipients. The pharmaceutical preparations may be, for example, a solid pharmaceutical composition in shaped dosage unit for oral ingestion, i.e., tablets or capsules, or the preparations may be in liquid form, solutions, suspensions or emulsions. The above acids, either singly or in mixtures thereof, can be combined with an inert, pharmaceutically acceptable liquid carrier to form a liquid pharmaceutical preparation, or the acids, either singly or in mixtures thereof, can be combined with a solid, non-toxic, orally-ingestible, pharmaceutical carrier to form a solid preparation such as a tablet or capsule. The pharmaceutical preparations may be sterilized or contain auxiliaries such as preserving, stabilizing, wetting, emulsifying or dispersing agents, disintegrating agents and lubricating agents. The compositions either in liquid form or solid form are preferably formulated to contain between 50 mg. and 100 mg. of the above glutamic acids, either singly or in mixtures thereof, per shaped dosage unit.

The following examples illustrate the invention. Unless indicated, parts are by weight.

EXAMPLE 9

50 parts of N-acetyl-α-L-aspartyl-L-glutamic acid are combined with 20 parts of lactone and 27 parts of a starch paste are added. The mixture is dried and pressed through a 20-mesh screen. 3 parts magnesium stearate as lubricant are added and the granules are pressed into 100 mg. tablets suitable for administration.

EXAMPLE 10

Tablets are prepared that have 50 mg. of active substance in each tablet and have the following composition

|  | Mg. |
|---|---|
| N-acetyl-α-L-aspartyl-L-glutamic acid | 50 |
| Lactone | 20 |
| Starch paste | 27 |
| Magnesium stearate | 3 |

Tablets may be formulated so that the daily dose of glutamic acid amounts to 50 to 200 mg., preferably with 4 administrations per day.

Toxicological data

For both rats and mice, $LD_{50}$ by mouth has been found to be higher than 5000 mg./kg.

$LD_{50}$ intravenously, for rats, was 292 mg./kg.

Intraperitoneally, doses of 0.5, 1 and 1.5 mg./kg. of body weight were injected to rats. The mortality, within 72 hours, was 0/6, 1/4 and 3/4 (dead/treated). The symptoms were: visceral irritation, torpidity of motion and ataxia. Substantially, a toxic sedative state.

Rabbits were intracisternally treated with doses of 1, 2, and 3 mg./kg. The injection was preceded by the subtraction of an equal volume of cerebrospinal fluid, and was effected slowly to avoid irritation phenomena which are easy to take place. The first 2 doses injected each to 4 animals, caused an increase of the muscular tone and the appearance of tremors. These symptoms continued for more than 4 hours.

After 12 hours the animals appeared completely normal.

In the following 7 days, no irritation could be observed in the treated animals.

In experiments of chronic toxicity, carried out on rats, results show that by administering 50 mg./kg. daily for 3 months, by mouth, no changes of weight, of liver and kidney function and of blood crasis are observed.

No damage of the organs were detected during the autoptic examination of the treated animals.

For humans, the following was observed:

N-acetyl-aspartyl-glutamic acid, administered for 30 days in the form of tablets at the daily dose of 200 mg. divided in 4 doses of 50 mg. each, to subjects in good health conditions, provoked no intolerance phenomena. In fact, no nausea, vomiting, pyrosis or rash, diarrhea or constipation phenomena were observed; the liver and kidney functions were normal, and no changes occurred for the cardio-circulatory apparatus.

Effects

An investigation has been carried out on the effects of the administration of N-acetyl-β-aspartyl-glutamic acid (NAAGA) by mouth to humans, as to improvement in mental efficiency or to reduce mental fatigue and related syndromes measured by means of some psychological tests.

Materials and methods

Treated subjects.—40 individuals, a homogeneous group as to age (20–40), sex (male) and education (from end of elementary school to three years general education thereafter) were utilized. The 40 subjects were divided into two groups (A and B), every one comprising individuals selected at random.

To every one of the 20 components of group A, 4 tablets of placebo, equal as to form, color, odor and taste to the NAAGA tablets, were administered; two to three hours after the tablet administration the individuals were subjected to the psychological tests. The next day, every individual received 4 or more placebo tablets and after two to three hours the same psychological tests were practiced again.

The 20 subjects comprising group B received 4 placebo tablets each on the first day, and two to three hours thereafter they were subjected to the different psychological tests. On the following day there were administered 4 tablets containing 50 mg. NAAGA each, per individual, and the psychological tests were repeated after two-three hours.

The rather complex experimental schedule, as above indicated, was thought to be necessary in order to distinguish the eventual effects, on the psychological tests, which could be ascribed to NAAGA, from those which were ascribed to learning; that is to the tests' improvement due merely to their repetition.

Neither the treated subjects nor the examiners knew whether NAAGA or placebo had been administered.

The 4 placebo tablets and the NAAGA tablets were swallowed all together.

Psychological tests

The psychological tests were as follows:

(1) Cattel test (a reagent of general "culture free" intelligence by R. B. Cattel and A. K. S. Cattel). Scale 2 was used for adults with education inferior to three years after elementary school, in its two parallel forms (one of which was employed on the first day of experiments, and the other on the following day). This test measures especially the ability to reason and evidences operations of the synthetical thought in the 4-sub-tests comprised by each form. The evaluation is made on the basis of total rating, that is to say, to the sum of ratings reported in the sub-tests. A higher rating indicates a better result.

(2) Koh's cubes.—Two parallel series were used (one employed on the first day and the other on the following day), each composed of eight colored designs, to be reconstituted with equally colored cubes. This test affords a measure of practical intelligence—that is to say, of intellective qualities for the solution of practical problems. The result is expressed by the total rating as obtained according to the time employed for reconstituting the eight designs of each series. Also in this test, a higher rating indicates a better result.

(3) Couve test.—This test consists of a picture containing the figures from 1 to 100, in disorder, which the subject has to count aloud according to their natural progressions, without omitting any of the figures. This test indicates the value of the attention qualities of a conactive type (imposed attention), within a rather wide perceptive field, with selection involving numerical data. The evaluation is expressed by the last number found within 5 minutes.

(4) Memory.—Two parallel charts were used (one employed the first day of the experiments, the other one on the following day), containing 12 different images each; the subject is allowed to observe the images for 30 seconds and after 5 minutes he should try to reproduce them by means of small image reproductions, to be selected among 25 and to be put on a suitable modulus. Thus, two aspects of memory are measured: the visible one, strictly connected to the fixation of engrams (also according to sensorial efficiency), as well as to recalling the same engrams, and the topographical one, relative to spacial localization of mnemonic images. The evaluation is made for visible memory on the basis of total, exactly recalled elements, and for topographical memory on the basis of total, correctly located elements.

(5) Thurstone scale.—This consists of a list of nine terms (nearly exhausted—fatigued—prostrated—a little tired—neither tired nor fatigued—nearly well—in due form—well—very well) among which the subject, at the end of the experiments, is invited to choose that which he thinks corresponds most nearly to his state of fatigue.

This expresses the "subjective fatigue," that is, the perception which the subject has of his own general efficiency at the end of the examinations. The nine terms are indicated, in the order as they are listed above, by the figures 1 to 9, so that the higher figures correspond to a lower fatigue.

Results

Table A shows the results relative to the 20 subjects of Group A, who were subjected, as pointed out above, to the psychlological tests for two consecutive days, the first day after receiving 4 placebo tablets and the following day after receiving 4 placebo tablets again.

Table B shows, on the contrary, the results as obtained in the 20 individuals of Group B, subject, as already stated to the psychological tests also for two consecutive days, however, the first day after being administered with 4 placebo tablets and the following day after administration of 4 NAAGA tablets.

In the group corresponding to table A, no considerable differences were found between the results obtained the first day and those of the following day. Some improvement—to be ascribed to learning—was noted only in the Kohs cubes test (1st day: average 31.00; 2nd day, average 34.85) and in the topographical memory (1st day; average 2.55; 2nd day, average 4.45). The other tests (Cattel, Couve, visible memory, Thurstone scale) gave almost identical results.

After NAAGA administration (table B), the Couve test showed no noteworthy variations (1st day, that is, after the placebo treatment; average 31.60; 2nd day, that is after the NAAGA treatment; 32.15). Visible memory also appeared scarely modified (1st day, average 7.93; 2nd day, average 5.25). Topographical memory is improved (1st day, average 3.80; 2nd day, average 4.86), but an analogous variation occurred, as it was already stressed, also in the control subjects (Table A) treated solely with placebo (1st day, average 2.55; 2nd day, average 4.45) and it is therefore to be ascribed to learning.

The improvement obtained after NAAGA in the Cattel test and in the Kohs cubes test was, on the contrary, sharper.

In fact, while in the control subjects (Table A), the Cattel test remained unchanged (1st day, average 25.55; 2nd day, average 25.90), in those treated with NAAGA it shows an average equal to 22.55 in the 1st day (that is after placebo administration) and 24.35 in the 2nd day (that is after NAAGA administration), with an increase of 8%.

Still more sensible was the difference in the results relative to the Kohs cubes test. In the control subjects (Table A) an increase of 12% (1st day, average 31.00; 2nd day, average 34.85) was recorded; in the individuals treated with NAAGA the increase was by 25.5% (1st day, average 29.80; and 2nd day average 37.45).

TABLE A.—SUBJECTS TREATED WITH PLACEBO

| Case No. | Age, years | Cattel I | Cattel II | Cubes I | Cubes II | Couve I | Couve II | Memory Visible I | Memory Visible II | Topographical I | Topographical II | Thurstone scale I | Thurstone scale II |
|---|---|---|---|---|---|---|---|---|---|---|---|---|---|
| 1 | 18 | 34 | 35 | 39 | 72 | 60 | 66 | 6 | 12 | 3 | 7 | 6 | 6 |
| 2 | 42 | 9 | 9 | 17 | 12 | 18 | 20 | 6 | 6 | 1 | 4 | 6 | 5 |
| 3 | 19 | 25 | 28 | 15 | 25 | 29 | 25 | 6 | 8 | 1 | 3 | 4 | 4 |
| 4 | 20 | 32 | 36 | 36 | 31 | 28 | 35 | 9 | 9 | 4 | 5 | 6 | 6 |
| 5 | 24 | 21 | 17 | 14 | 8 | 23 | 33 | 8 | 8 | 0 | 0 | 4 | 6 |
| 6 | 28 | 30 | 27 | 32 | 32 | 36 | 37 | 5 | 8 | 1 | 4 | 9 | 9 |
| 7 | 30 | 28 | 31 | 37 | 57 | 47 | 51 | 8 | 7 | 2 | 3 | 4 | 5 |
| 8 | 35 | 29 | 30 | 45 | 22 | 34 | 35 | 10 | 11 | 8 | 9 | 3 | 6 |
| 9 | 29 | 15 | 21 | 22 | 6 | 18 | 21 | 7 | 7 | 2 | 1 | 4 | 5 |
| 10 | 43 | 12 | 9 | 16 | 10 | 28 | 28 | 8 | 7 | 1 | 4 | 8 | 9 |
| 11 | 29 | 32 | 31 | 55 | 65 | 30 | 36 | 7 | 10 | 4 | 8 | 6 | 5 |
| 12 | 38 | 19 | 23 | 28 | 35 | 18 | 19 | 6 | 4 | 2 | 1 | 1 | 2 |
| 13 | 36 | 29 | 26 | 14 | 18 | 25 | 25 | 7 | 9 | 2 | 3 | 6 | 5 |
| 14 | 33 | 27 | 32 | 28 | 53 | 30 | 31 | 8 | 9 | 3 | 6 | 6 | 6 |
| 15 | 26 | 33 | 29 | 29 | 51 | 31 | 35 | 10 | 6 | 4 | 3 | 5 | 4 |
| 16 | 26 | 25 | 28 | 29 | 13 | 49 | 31 | 10 | 10 | 2 | 6 | 5 | 5 |
| 17 | 22 | 27 | 31 | 57 | 68 | 39 | 33 | 10 | 10 | 3 | 6 | 5 | 5 |
| 18 | 38 | 21 | 18 | 22 | 35 | 26 | 34 | 8 | 8 | 1 | 5 | 6 | 8 |
| 19 | 25 | 30 | 28 | 23 | 12 | 47 | 48 | 10 | 9 | 4 | 7 | 4 | 4 |
| 20 | 30 | 33 | 29 | 62 | 72 | 34 | 33 | 20 | 11 | 3 | 4 | 4 | 5 |
| Average | | 25.55 | 25.90 | 31.00 | 34.85 | 32.50 | 33.80 | 8.45 | 8.45 | 2.55 | 4.45 | 5.10 | 5.50 |

I=first day (after 4 placebo tablets).
II=second day (after 4 placebo tablets).

TABLE B.—SUBJECTS TREATED WITH NAAGA

| Case No. | Age, years | Cattel I | Cattel II | ubes I | ubes II | Couve I | Couve II | Memory Visible I | Memory Visible II | Topographical I | Topographical II | Thurstone scale I | Thurstone scale II |
|---|---|---|---|---|---|---|---|---|---|---|---|---|---|
| 1 | 36 | 16 | 14 | 5 | 11 | 20 | 22 | 8 | 8 | 5 | 4 | 4 | 4 |
| 2 | 34 | 26 | 17 | 20 | 23 | 32 | 35 | 11 | 11 | 4 | 5 | 3 | 4 |
| 3 | 34 | 22 | 27 | 29 | 24 | 38 | 36 | 10 | 9 | 4 | 6 | 9 | 8 |
| 4 | 36 | 17 | 23 | 37 | 38 | 31 | 26 | 8 | 6 | 6 | 4 | 2 | 3 |
| 5 | 42 | 18 | 22 | 26 | 27 | 27 | 30 | 8 | 6 | 4 | 5 | 4 | 3 |
| 6 | 39 | 20 | 18 | 19 | 27 | 31 | 25 | 7 | 8 | 2 | 6 | 4 | 4 |
| 7 | 26 | 21 | 21 | 15 | 14 | 25 | 28 | 6 | 9 | 3 | 2 | 4 | 4 |
| 8 | 31 | 27 | 30 | 29 | 46 | 29 | 35 | 9 | 9 | 5 | 5 | 1 | 4 |
| 9 | 31 | 26 | 27 | 26 | 37 | 30 | 31 | 8 | 10 | 3 | 6 | 4 | 4 |
| 10 | 19 | 28 | 29 | 33 | 47 | 32 | 36 | 9 | 10 | 4 | 9 | 6 | 6 |
| 11 | 37 | 20 | 34 | 35 | 58 | 38 | 34 | (*) | (*) | (*) | (*) | 4 | 4 |
| 12 | 36 | 12 | 17 | 32 | 23 | 19 | 24 | (*) | (*) | (*) | (*) | 5 | 5 |
| 13 | 33 | 36 | 38 | 55 | 70 | 50 | 40 | (*) | (*) | (*) | (*) | 5 | 4 |
| 14 | 32 | 21 | 21 | 25 | 47 | 30 | 37 | (*) | (*) | (*) | (*) | 5 | 9 |
| 15 | 29 | 29 | 32 | 40 | 68 | 37 | 31 | (*) | (*) | (*) | (*) | 4 | 5 |
| 16 | 28 | 30 | 28 | 48 | 49 | 35 | 34 | 5 | 9 | 1 | 8 | 6 | 8 |
| 17 | 36 | 16 | 15 | 4 | 13 | 25 | 32 | 5 | 7 | 6 | 2 | 3 | 8 |
| 18 | 39 | 23 | 24 | 40 | 57 | 37 | 36 | 9 | 6 | 3 | 5 | 4 | 2 |
| 19 | 40 | 21 | 24 | 29 | 24 | 36 | 40 | 7 | 7 | 4 | 3 | 4 | 8 |
| 20 | 36 | 22 | 26 | 49 | 46 | 30 | 31 | 9 | 9 | 3 | 3 | 7 | 8 |
| Average | | 22.55 | 24.35 | 29.80 | 37.45 | 31.60 | 32.15 | 7.93 | 8.26 | 3.80 | 4.86 | 4.40 | 5.25 |

I=first day (after 4 placebo tablets).
II=second day (after 4 NAAGA tablets).
*=The memory test was not carried out because of technical reasons.

What is claimed is:

1. A method for treating mental fatigue in man and animals which comprises internally administering to said man and animals a therapeutically effective amount of a member selected from the group consisting of:
N-acetyl-α-L-aspartyl-L-glutamic acid,
N-acetyl-β-L-aspartyl-L-glutamic acid.

2. A method as claimed in claim 1 wherein the member is N-acetyl-α-L-aspartyl-L-glutamic acid.

3. A method as claimed in claim 1 where the member is N-acetyl-β-L-aspartyl-L-glutamic acid.

4. A method as claimed in claim 1 wherein said therapeutically effective amount is 50 mg. to 100 mg.

5. A method as claimed in claim 1 wherein the member is administered in the form of a solid pharmaceutical composition in shaped dosage unit for oral ingestion; the said dosage unit containing at least 10 mg. of said member and a solid, nontoxic, orally-ingestible, pharmaceutical carrier.

6. A method as claimed in claim 5 wherein the compound is N-acetyl-α-L-aspartyl-L-glutamic acid.

7. A method as claimed in claim 5 wherein the therapeutic is N-acetyl-β-L-aspartyl-L-glutamic acid.

8. A method as claimed in claim 5 wherein said dosage unit contains 50 mg. to 100 mg. of said member.

References Cited

UNITED STATES PATENTS 3,178,342  4/1965  Buzas _____ 424—319

OTHER REFERENCES

Chem. Abst. 64–6744e (1966).
Science, vol. 108, p. 281 (Sept. 10, 1948).

STANLEY J. FRIEDMAN, Primary Examiner